United States Patent [19]
Brown

[11] Patent Number: 5,671,898
[45] Date of Patent: Sep. 30, 1997

[54] AIRCRAFT HAVING FIXED AND PIVOTAL WINGS

[76] Inventor: Bruce B. Brown, 18323 Soledad Canyon Rd., #23 Canyon Country, Calif. 91351

[21] Appl. No.: 602,958

[22] Filed: Feb. 16, 1996

[51] Int. Cl.$^6$ .................... B64C 3/38; B64C 3/56
[52] U.S. Cl. .................. 244/46; 244/39; 244/49; 244/129.4
[58] Field of Search ............ 244/39, 218, 45 R, 244/46, 49, 130, 129.4, 224

[56] References Cited

U.S. PATENT DOCUMENTS

| | | | |
|---|---|---|---|
| 2,601,962 | 7/1952 | Douglas . | |
| 2,793,826 | 5/1957 | Fiedler | 244/46 |
| 3,279,721 | 10/1966 | Dethman | 244/46 |
| 3,489,375 | 1/1970 | Tracy | 244/56 |
| 3,662,974 | 5/1972 | Peterson | 244/218 |
| 3,794,273 | 2/1974 | Girard | 244/7 A |
| 3,971,535 | 7/1976 | Jones | 244/46 |
| 4,667,898 | 5/1987 | Greenhalgh | 244/46 |
| 4,842,218 | 6/1989 | Groutage et al. | 244/49 |
| 4,913,378 | 4/1990 | Calvert | 244/46 |
| 4,998,689 | 3/1991 | Woodcock | 244/46 |
| 5,118,052 | 6/1992 | Alvarez Calderon F | 244/218 |

OTHER PUBLICATIONS

Report entitled Dynamic Stability of Space Vehicles, vol. XII–Re–Entry Vehicle Landing Ability and Control by B.J. Kuchta, 3 pages; dated: 1968.

*Primary Examiner*—Andres Kashnikow
*Assistant Examiner*—Virna Lissi Mojica
*Attorney, Agent, or Firm*—Kelly Bauersfeld Lowry Kelley, LLP

[57] ABSTRACT

An aircraft having variable airframe geometry includes an elongate fuselage having top and bottom sides, a swept back, high-speed wing mounted to the top of the fuselage, and a high aspect ratio, low-speed wing pivotally mounted adjacent to the bottom of the fuselage. The low-speed wing is adapted to pivot between a slow speed flight position in which a longitudinal axis of the low-speed wing is generally perpendicular to a longitudinal axis of the fuselage, and a high-speed flight position in which the longitudinal axis of the low-speed wing is generally parallel to the longitudinal axis of the fuselage. A fairing extends from the fuselage for receiving at least a portion of the low-speed wing when pivoted into the high-speed flight position. The low-speed wing further includes landing gear.

13 Claims, 2 Drawing Sheets

AIRCRAFT HAVING FIXED AND PIVOTAL WINGS

BACKGROUND OF THE INVENTION

The present invention relates to improvements in winged aircraft. More specifically, the present invention relates to an aircraft having a fixed, swept back, high-speed wing mounted to a top of the fuselage, and a low-speed wing pivotally mounted adjacent to a bottom of the fuselage.

It is well known that the airframe configuration requirements for efficient high-speed flight are not compatible with the airframe configuration requirements for efficient slow speed flight, take-off and climb, or descent and landing. For low-speed flight and conventional take-off and landing, the optimum wing platform is generally considered to be a long span, narrow chord wing having little, if any, sweep angle.

Since the total lift developed by a lifting airfoil, with other factors such as angle of attack and dynamic pressures being equal, is substantially dependent on the aspect ratio of the airfoil, defined as the square of the span of the airfoil divided by the surface area thereof, it is apparent that a long narrow wing is capable of developing substantially greater lift-to-drag ratio than is attainable using a short broad wing of the same plan area. The use of the high aspect ratio wing offers the advantages that the angle of attack required for landing and take-off is at the low end of the spectrum. The take-off and landing speeds are lower than for low aspect ratio wings, thus permitting a relatively short take-off and landing, as well as a low-speed climb to altitude. Furthermore, the drag due to lift is also at the low end of the spectrum, thereby providing high aerodynamic efficiency for subsonic cruise and lower power requirement during take-off and landing.

For high-speed flight, however, highly swept wings are considered preferred because aerodynamic drag may be greatly reduced thereby, and other advantages are also obtained. For example, during high altitude subsonic cruise the highly swept wing configuration develops a comparatively low drag coefficient, while still developing the required lift coefficient. However, a swept wing aircraft designed solely on the basis of high-speed performance flight will obviously not perform satisfactorily for low-speed cruise, take-off and landing.

Commercial airliners attempt to cope with the higher speeds necessitated by swept wing designs by adding leading edge and trailing edge flaps. This is nothing more than modifying the high-speed wing design to attempt to do two types of flying. That such designs are only partially successful is proven by the fact that large commercial airliners and transports require reverse thrust on their engines upon landing. Further, airports are now being built with collapsible runways to prevent runway overruns.

Accordingly, there has been a need for a novel aircraft which may have a variable airframe geometry and a construction suitable for use in commercial airliners and cargo aircraft. Such a novel aircraft is needed which incorporates the benefits of swept back, low aspect ratio wing designs for purposes of high-speed flight, and yet advantageously utilizes high aspect ratio, low-speed wing designs for take-off and landing purposes. Insofar as possible, such a novel aircraft should incorporate proven aircraft design features. The present invention fulfills these needs and provides other related advantages.

SUMMARY OF THE INVENTION

The present invention resides in an aircraft having variable airframe geometry, comprising a fuselage, a high-speed wing fixed to the fuselage, and a low-speed wing pivotally attached to the fuselage below and spaced from the high-speed wing.

In a preferred form of the invention, an elongate fuselage is provided having top and bottom sides. The high-speed wing comprises a swept back, low aspect ratio wing which is mounted to the top of the fuselage. The low-speed wing comprises a single spar, high aspect ratio wing that includes landing gear for the aircraft.

Means are provided for pivoting the low-speed wing between a slow speed flight position and a high-speed flight position generally through a ninety degree arc. More particularly, in the slow speed flight position a longitudinal axis of the low-speed wing is generally perpendicular to a longitudinal axis of the fuselage. In the high-speed flight position the longitudinal axis of the low-speed wing is generally parallel to the longitudinal axis of the fuselage and lies generally adjacent to the bottom of the fuselage.

Means are provided for reducing drag of the low-speed wing when pivoted into the high-speed flight position. The drag reducing means includes a fairing which extends from the fuselage. At least a portion of the low-speed wing fits within the fairing when pivoted into the high-speed flight position. The fairing also includes a wing tip lock.

Features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
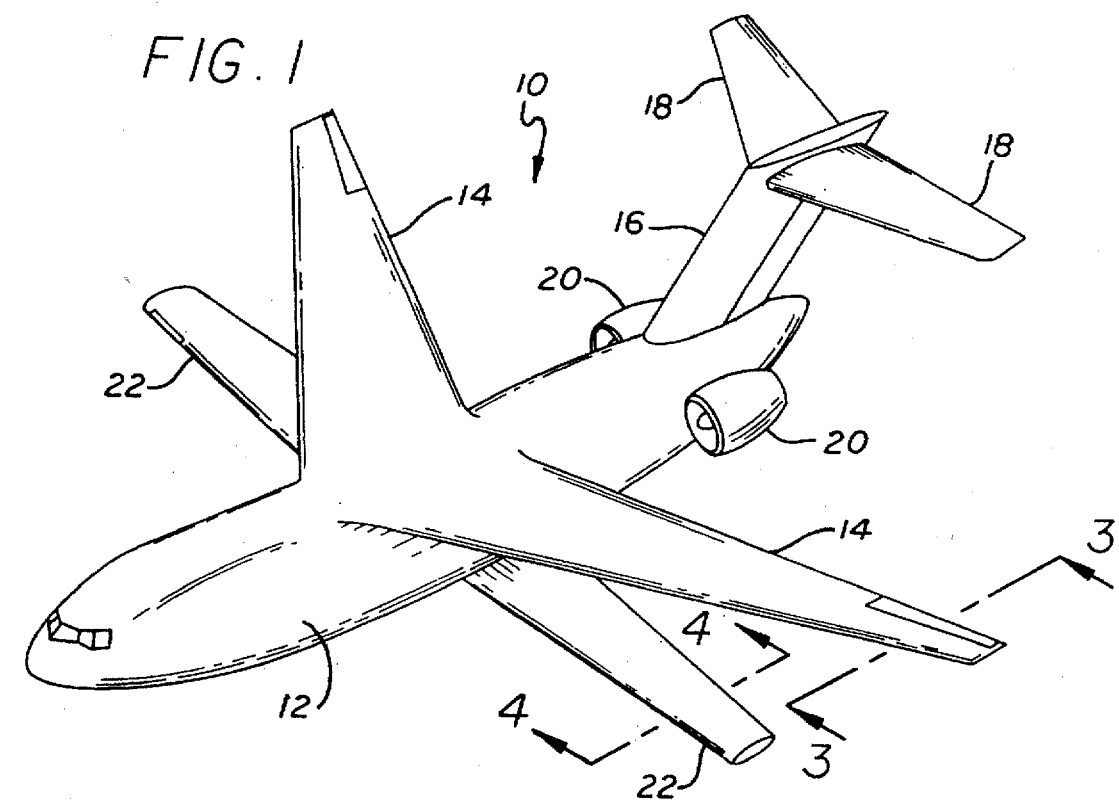
FIG. 1 is a top, front and left side perspective view of an aircraft having fixed and pivotal wings embodying the invention, wherein a pivotal low-speed wing is shown in a slow speed flight position.

As shown in the drawings for purposes of illustration, the present invention is concerned with a novel aircraft having variable airframe geometry, generally designated in the accompanying drawings by the reference number 10. The aircraft 10 includes, as is well known in the art, an elongate fuselage 12, a swept back, low aspect ratio, high-speed wing 14 mounted to the top of the fuselage 12, a vertical stabilizer 16 extending upwardly from a rear end of the fuselage, and a pair of horizontal stabilizers 18 extending outwardly from the vertical stabilizer 16. Further, a pair of jet propulsion units 20 are illustrated as attached to a rear portion of the fuselage 12.

Figure 2:
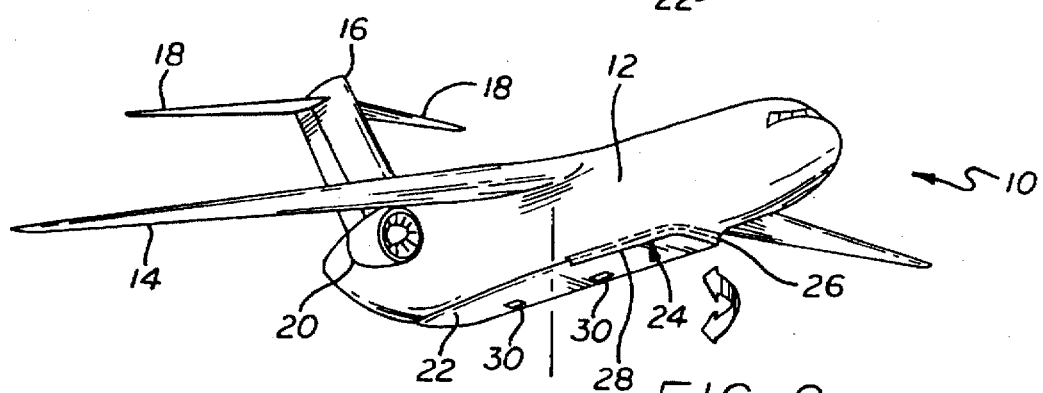
FIG. 2 is a bottom, front and right side perspective view of the aircraft of FIG. 1, wherein the low-speed wing is shown pivoted into a high-speed flight position.
Figure 3:
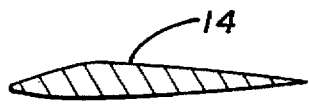
FIG. 3 is an enlarged sectional view of a high-speed wing taken generally along the line 3—3 of FIG. 1.
Figure 4:
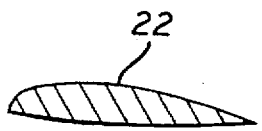
FIG. 4 is an enlarged sectional view of the low-speed wing taken generally along the line 4—4 of FIG. 1.
Figure 5:
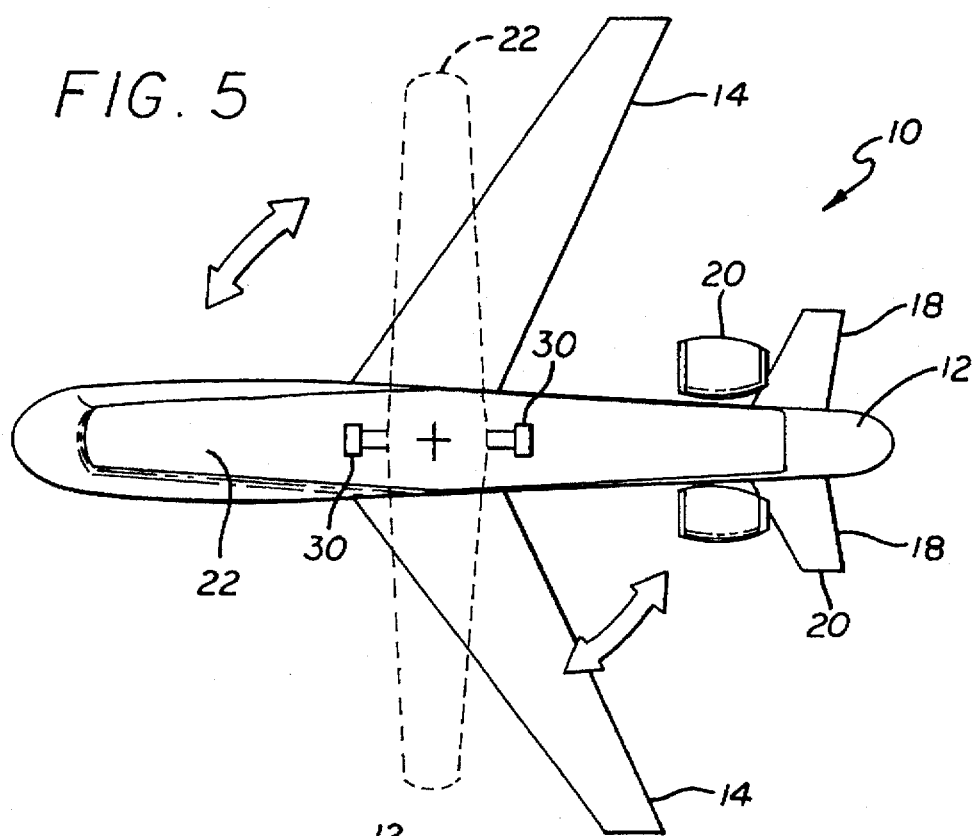
FIG. 5 is a bottom plan view of the aircraft wherein the low-speed wing is shown pivoted into its high-speed flight position (as shown in FIG. 2), and wherein the low-speed wing is shown in phantom in its slow speed flight position (as shown in FIG. 1)
Figure 6:
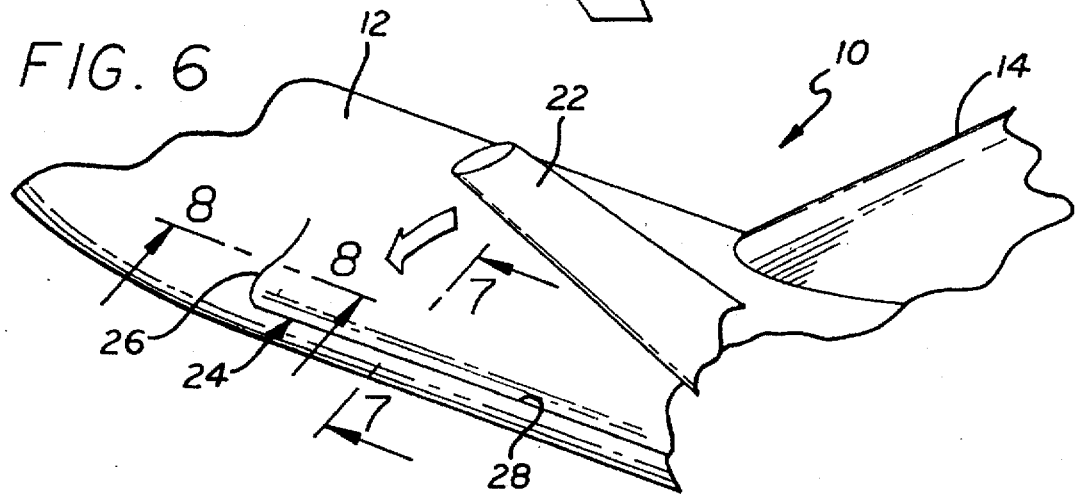
FIG. 6 is a fragmented bottom and left side perspective view of the aircraft, illustrating the manner in which the low-speed wing is received within a fairing when pivoted into its high-speed flight position.

In accordance with the present invention, the aircraft 10 is provided a low-speed wing 22 which is pivotally mounted adjacent to the bottom of the fuselage 12. The low-speed wing 22 comprises a single spar, high aspect ratio wing that is pivotal generally through a ninety degree arc (see FIG. 5). More particularly, the low-speed wing 22 pivots between a slow speed flight position (as illustrated in FIG. 1), and a high-speed flight position (as illustrated in FIG. 2). In the slow speed flight position, a longitudinal axis of the low-speed wing 22 is generally perpendicular to a longitudinal axis of the fuselage 12. In the high-speed flight position, the longitudinal axis of the low-speed wing 22 is generally parallel to the longitudinal axis of the fuselage. When pivoted into the high-speed flight position (FIG. 2), the low-speed wing 22 lies generally adjacent to the lower surface or bottom of the fuselage 12.

Figure 8:
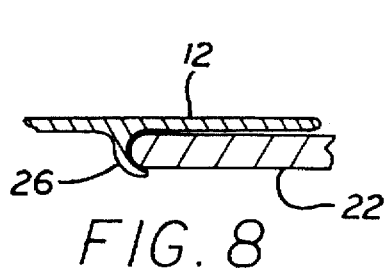
FIG. 8 is an enlarged fragmented sectional view taken generally along the line 8—8 of FIG. 6, illustrating the manner in which a wing tip is locked within a leading edge of the fairing.
Figure 7:
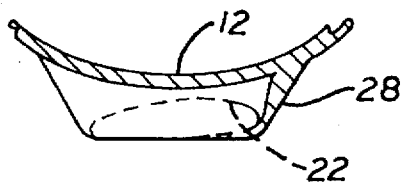
FIG. 7 is an enlarged fragmented sectional view taken generally along the line 7—7 of FIG. 6.

The fuselage 12 includes means for reducing drag of the low-speed wing 22 when pivoted into the high-speed flight position. Such drag reducing means includes a fairing 24 into which at least a portion of the low-speed wing 22 fits when pivoted into the high-speed flight position. As shown best in FIGS. 2 and 6-8, the fairing 24 includes a front component 26 and a side component 28 for receiving, at least, a leading edge and wing tip of a left portion of the low-speed wing 22. The front component 26 further functions as a wing tip lock (see FIG. 8).

The low-speed wing 22 further includes landing gear 30 for the aircraft 10. Since the low-speed wing 22 will always be pivoted into the slow speed flight position (FIG. 1) for purposes of take-off and landing, the landing gear 30 will always be properly positioned for normal operation when required.

From the foregoing it will be appreciated that during cruising, the low-speed wing 22 will normally be rotated into the high-speed wing position (FIG. 2), a slip stream position offering very little drag. When a pilot shifts to a landing mode, the low-speed wing 22 will be rotated to the slow-speed flight position, at a right angle to the fuselage 12. The addition of the extra low-speed wing 22 allows the pilot to safely slow the airplane's speed to approximately one half of what is considered normal today when only high-speed, swept wing designs are utilized. Thus, the pilot would only use a small portion of the available runway, and reverse thrust would not be required. The military in particular will find the present design useful because it will allow air transports to be operated out of primitive airports and yet allow the aircraft 10 to deliver loads at supersonic speeds. The extra wing 22 will allow a transport aircraft 10 to fly at much higher speeds than standard aircraft because the high-speed wing 14 can be more extreme. The addition of the second wing 22 provides additional space for fuel, thus increasing the range of the aircraft 10 beyond that now available.

Placement of the low-speed wing 22 on the bottom of the fuselage 12 simplifies the aircraft construction. The single spar, high camber wing 22 can be supported from a single pivot attached to the main spar. The pivot for the low-speed wing 22 can be external to the aircraft 10, thereby providing a smooth interior floor. The landing gear 30 may be retracted into the wing 22, and when extended they may be locked to fuselage 12 hard points. Such a design removes stress from pivot.

The high-speed wing 14 is preferably designed to operate at the transition speed from two wing to one wing operation. The high-speed wing may be simplified by the removal of leading and trailing edge flaps.

Many things have come together to make such an aircraft 10 design possible. Use of materials such as Kevlar aramid allow production of a lightweight wing that can be reinforced at any point by lamination. Further, metals have been made strong enough that a wing can be supported from a single pivot. In fact, many of todays high performance aircraft are dependent on a pivoting wing.

Airplanes having a 1,000 passenger capacity are being considered. The addition of the extra low-speed wing 22 would add to the safety of the new airplane and allow it to operate from standard airports.

Although a particular embodiment of the invention has been described in detail for purposes of illustration, various modifications may be made without departing from the spirit and scope of the invention. Accordingly, the invention is not to be limited, except as by the appended claims.

I claim:

1. An aircraft having variable airframe geometry, comprising:

an elongate fuselage having top and bottom sides;

a swept back, low aspect ratio, high-speed wing fixedly mounted to the top of the fuselage; and a low-speed wing mounted adjacent to the bottom of the fuselage and pivotable between a slow speed flight position in which a longitudinal axis of the low-speed wing is generally perpendicular to a longitudinal axis of the fuselage, and a high-speed flight position in which the longitudinal axis of the low-speed wing is generally parallel to the longitudinal axis of the fuselage, the low-speed wing comprising a single spar, high aspect ratio wing which, in the slow speed flight position, spans across the fuselage, and, in the high speed flight position, lies adjacent to the bottom side of the fuselage.

2. The aircraft of claim 1, including means for reducing drag of the low-speed wing when pivoted into the high-speed flight position, wherein the drag reducing means includes a fairing extending from the fuselage, into which at least a portion of the low-speed wing fits when pivoted into the high-speed flight position.

3. The aircraft of claim 2, wherein the fairing includes a wing tip lock.

4. The aircraft of claim 1, wherein the low-speed wing includes landing gear.

5. An aircraft, comprising:

an elongate fuselage having top and bottom sides;

a swept back, low aspect ratio, high-speed wing mounted to the top of the fuselage;

a single spar, high aspect ratio, low-speed wing mounted adjacent to the bottom of the fuselage;

means for pivoting the low-speed wing between a slow speed flight position in which a longitudinal axis of the low-speed wing is generally perpendicular to a longitudinal axis of the fuselage, and a high-speed flight position in which the longitudinal axis of the low-speed wing is generally parallel to the longitudinal axis of the fuselage and in which the low-speed wing lies generally adjacent to the bottom side of the fuselage; and a fairing extending from the fuselage into which at least a portion of the low-speed wing fits when pivoted into the high-speed flight position, wherein the fairing includes a wing tip lock.

6. The aircraft of claim 5, wherein the low-speed wing includes landing gear.

7. An aircraft, comprising:

a fuselage;

a high-speed wing fixedly extending from the fuselage; and a low-speed wing attached to a lower surface of the fuselage and pivotable between a slow speed flight position in which a longitudinal axis of the low-speed wing is perpendicular to a longitudinal axis of the fuselage, and a high-speed flight position in which the longitudinal axis of the low-speed wing is parallel to the longitudinal axis of the fuselage, the low-speed wing comprising a single spar, high aspect ratio wing which, in the slow speed flight position, spans across the fuselage, and, in the high-speed flight position, lies entirely adjacent to the lower surface of the fuselage.

8. The aircraft of claim 7, wherein the high-speed wing comprises a swept back, low aspect ratio wing.

9. The aircraft of claim 8, wherein the high-speed wing is mounted to a top of the fuselage.

10. The aircraft of claim 7, wherein the low-speed wing includes landing gear.

11. The aircraft of claim 7, including means for reducing drag of the low-speed wing when pivoted into the high-speed flight position.

12. The aircraft of claim 11, wherein the drag reducing means includes a fairing extending from the fuselage, into which a tip of the low-speed wing fits when pivoted into the high-speed flight position.

13. The aircraft of claim 12, wherein the fairing includes a wing tip lock.

* * * * *